Aug. 1, 1961 A. B. HILDEBRANDT 2,994,390
ROCK BIT CUTTER

Filed Aug. 21, 1956 4 Sheets-Sheet 1

Alexander B. Hildebrandt Inventor
By W.O. Heilman Attorney

Aug. 1, 1961 A. B. HILDEBRANDT 2,994,390
ROCK BIT CUTTER

Filed Aug. 21, 1956 4 Sheets-Sheet 3

Alexander B. Hildebrandt  Inventor

By John D. Dassett  Attorney

Alexander B. Hildebrandt  Inventor
By *John D. Gassett*  Attorney

United States Patent Office 2,994,390
Patented Aug. 1, 1961

2,994,390
ROCK BIT CUTTER
Alexander B. Hildebrandt, Tulsa, Okla., assignor, by mesne assignments, to Jersey Production Research Company
Filed Aug. 21, 1956, Ser. No. 605,254
5 Claims. (Cl. 175—378)

The present invention relates generally to rotary drill bits for use in boring operations and more particularly to improved cutter elements for use in such bits. The invention is especially concerned with drill bits and cutter elements that may be employed in penetrating very hard formations such as chert, basalt, limestone and the like.

Rotary type bits have found wide application in the petroleum industry for drilling gas wells, oil wells and the like. Generally speaking, these bits employ a plurality of roller cutter elements which are rotated and thrust against the earth. Each element is provided with teeth, disks, or equivalent means for penetrating the earth and causing it to fracture into small chips that are usually referred to as drill cuttings. These cuttings are removed from the vicinity of the bit by directing a stream of fluid such as air, water, drilling mud, etc. past the bit. The fluid picks up the cuttings and carries them out of the bore hole, thereby facilitating the action of the cutter elements and also improving the efficiency of the drilling operation. At this point it will be well to note that drilling fluids are used not only to remove drill cuttings from a bore hole but also to cool and lubricate the cutting elements of the bit.

While rotary-type drill bits employing roller cutting elements have been widely accepted for use in drilling operation and while they have performed reasonably well, nevertheless these bits and cutter elements are still characterized by a number of deficiencies. For example, most roller type cutter elements are designed such that their teeth create a gear track on the bottom of a hole in order to transmit a chipping or tearing action to other teeth on the same element. This action, while it is effective in penetrating hard earth formations, causes the cutting elements to wear rapidly from abrasion and also to slow penetration in the geared surface. Furthermore, the bottom of the hole is generally quite rough, and the drilling fluid finds difficulty in maintaining a clean hole. This latter factor seriously detracts from the overall efficiency of a drilling operation.

In most conventional rotary drill bits, it is also general practice to employ a plurality of cutter elements which are designed to mesh with one another. In other words, the cutting teeth on each element are staggered with respect to the teeth on adjacent cutter elements so that they engage separate portions of a bore hole bottom as they rotate along the bottom. This arrangement or positioning of the teeth on the various cutter elements results in a degree of cooperation between the elements; but damage or excessive wear to any one of the elements necessarily impairs the cutting efficiency of all of the elements.

Accordingly, it is an object of the present invention to provide an improved type of roller cutter element wherein each element operates substantially independently of each other element. Furthermore, each cutter element of the invention is of a character to crush the complete bottom surface of a bore hole independently of the other cutter elements. One cutter element may therefore be employed, but three cutter element combinations are preferred in view of the known advantages which characterize bits that employ three elements. These multi-cutter combinations may employ the same cutter element configurations and layouts that are employed in most conventional rotary bits.

It is a further object of the invention to provide cutter elements and a rotary bit which forms a hole with a smooth bottom so that drilling fluid may readily remove cuttings from the hole and keep the bottom surface clean.

It is another object of the invention to provide roller cutting elements and a rotary bit incorporating such elements which are characterized by markedly improved drilling efficiency and reduced wear. It is a specific object of the invention to provide cutter elements and drill bits which are especially characterized by an improved ability to penetrate hard rock formations.

These and related objectives, which will be explicitly described or readily apparent in the following description, are attained in accordance with the invention by the use of an essentially conical cutter element, the wall surface of which is provided with a plurality of ridges. The ridges on each cutter element are substantially parallel to the base portion of the element and extend half way around the periphery of the element. Adjacent ridges are spaced from each other a distance approximately equal to one-half the height of each ridge. Furthermore, adjacent ridges extend around opposite semi-peripheries of each element, so that the beginning of one ridge falls between the ends of adjacent ridges. Thus, the individual ridges are in effect staggered and therefore track between the paths that are taken by the next adjacent ridges on each side.

Each conical element of the invention is further characterized by possessing a diameter at its base which is approximately two-thirds the effective diameter of the overall bit. Assuming the effective diameter of the bit to be the diameter of the hole which is cut by the bit, the diameter of the base of each conical element should be approximately two-thirds the diameter of the hole.

The slant height of cutter elements of the invention which extend to the very center of a bore hole will be one-half the diameter of the hole, while the slant height of cutter elements which do not extend entirely to the center line of a hole will necessarily be somewhat less than one-half the diameter of the hole. The use of conical elements in tri-cone bits wherein one of the elements is made slightly longer than the other two elements is well known in the art; and it is therefore considered unnecessary to enlarge on this paticular point in the present description. It follows, however, that some cutter elements of the invention may be somewhat frusto-conical in structure, but all of the elements are nevertheless essentially conical.

The cutter elements of the invention may be provided with conventional-type bearings and they may be replaceably mounted within a bit shank in any one of several usual manners. The ridges that are formed on the surface of the elements may be constructed and fabricated from materials such as tungsten carbide and the like which have found wide application in rock drills. The hardened ridges may, furthermore, be made integral with the cutter elements; or, alternatively, they may be separately fabricated and thereafter inserted into the elements.

As is conventional in the art, the apex or apex portion of each cutter element of the invention is disposed toward the center of the bit (i.e. the hole which is formed by the bit) and the slant or wall surface of the element is thrust against and rolled around the bottom of a hole.

The invention may be better understood by reference to the drawing wherein.

Figure 1:
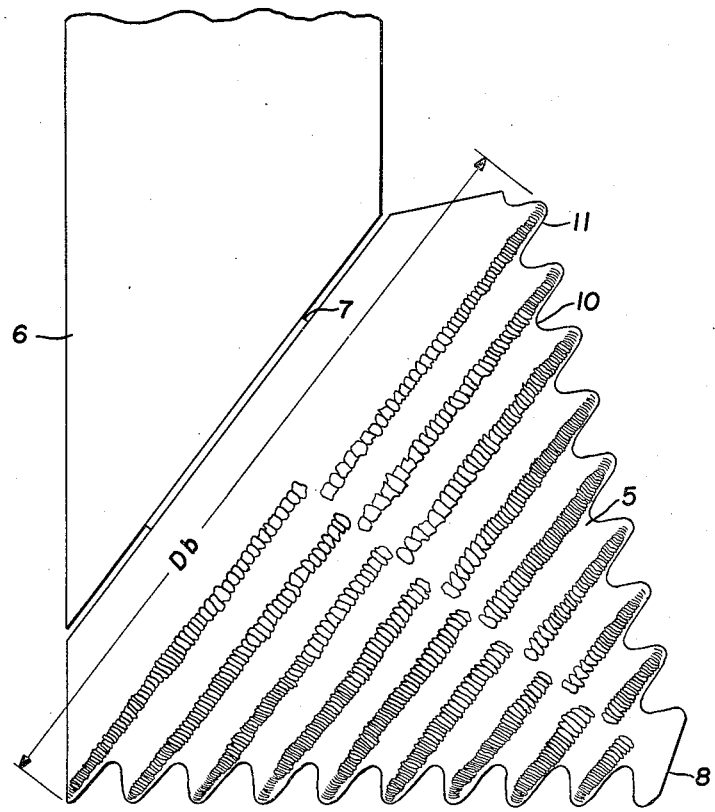
FIG. 1 illustrates a side view of a cutter element which constitutes a preferred embodiment of the invention.

Referring first to the drawing, there is illustrated therein a conical cutter element 5 which is supported within shank 6 by means of bearing 7.

Figure 2:
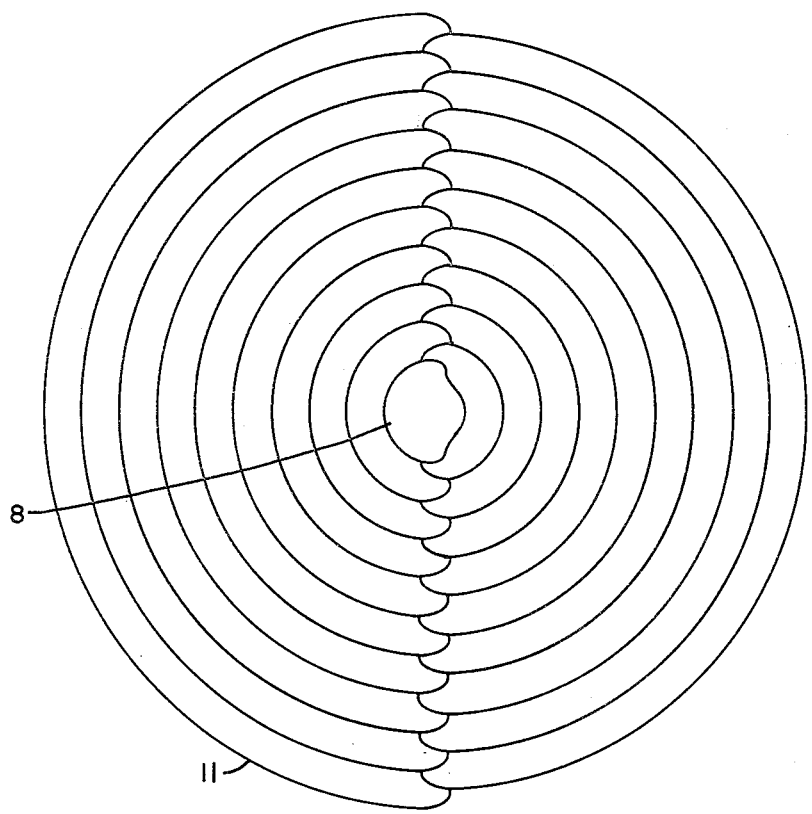
FIG. 2 illustrates a bottom end view of the apparatus illustrated in FIG. 1.

The conical element 5 has an apex portion 8, a base portion 9, and a side wall 10 which extends from the apex to the base. The peripheral wall surface of the element is covered with a plurality of ridges 11, each ridge extending half way around the periphery of the element. As illustrated, the ridges are essentially parallel to the base portion of the element; and they are staggered such that the beginning or starting point of each ridge lies adjacent and is spaced between the terminal or end points of adjacent ridges. Expressed otherwise, adjacent ridges on the same peripheral half of the side wall surface 10 are separated by what may be referred to as a ridge pitch distance which is approximately equal to one-half the height of the ridge; and each ridge on one peripheral half of the wall surface is separated from an adjacent ridge on the other half of the wall surface by a distance equal to about one-half the ridge pitch distance. The separation of the two groups of ridges on the peripheries of the sides is illustrated in Fig. 2.

The ridge pitch distance and the height of the ridges on each cutter element as well as the configuration of the ridges may vary with individual drilling conditions, as will be apparent to persons skilled in the art. Generally speaking, however, it is contemplated that the cutter elements of this invention shall generally contain between about five and ten ridges on each peripheral half of the elements. It is further generally contemplated that the ridges should possess a height between about ½ inch and 1 inch.

As mentioned earlier in this description, the individual ridges may be formed integrally with the main body of each cutter element; or they may be separately constructed or fabricated and then imbedded or otherwise secured within the main body of element. In either case, it is desirable that the individual ridges be constructed so that they form essentially continuous rings and not rows of discrete teeth along the periphery of a cutter.

Assuming that the effective diameter of the hole to be cut by the bit shown in the drawing is $D_h$, it is necessary that the illustrated cutter element of the invention have a base diameter, $D_b$, which is equal to about ⅔ $D_h$. As illustrated in the drawing the base diameter of each cutter element is considered to be the maximum distance across the cutter which is formed by the ridges on the cutter.

Figure 4:
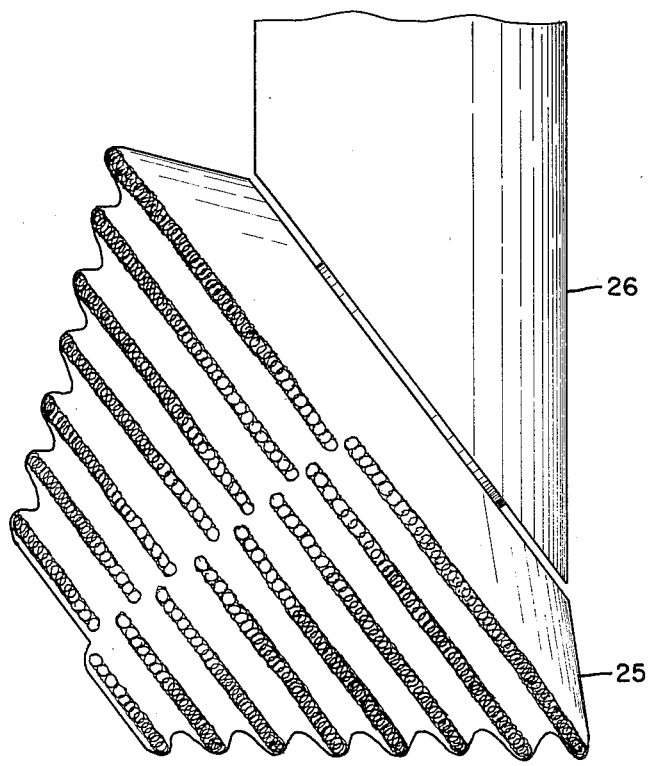
FIG. 4 illustrates a frusto-conical bit.

As further mentioned earlier, the slant height—i.e. the distance along the side wall surface from the base portion to the apex—of each cutter element should be substantially equal to one-half the diameter of the hole to be formed by the bit utilizing the element. For example, assuming that a single cutter element is to be employed in a bit, the slant height should be approximately one-half the diameter of the hole. In bits employing a plurality of cutters—e.g. three cutters—two of the cutters may be slightly truncated, and the third cutter provided with a spearpoint according to accepted practice. A truncated bit 25 supported from shank 26 is illustrated in FIG. 4.

Upon further consideration of the cutter element illustrated in the drawing and described above, it will be apparent that each ridge on the surface of the element will not track along the same travel path at the bottom of a bore hole until the element has traveled twice around the circumference of the hole. It will further be apparent that the staggered relationship of the ridges on the cutter element prevent the ridges from following the same travel path as the element travels around the hole. As a result, the cutter covers or contacts substantially the entire surface of the bottom of a bore hole, and prominent grooves or gear tracks in the bottom hole surface are avoided. The surface of the bottom is therefore smooth, and cuttings are readily removable therefrom by passing a cutting fluid past the surface.

Figure 3:
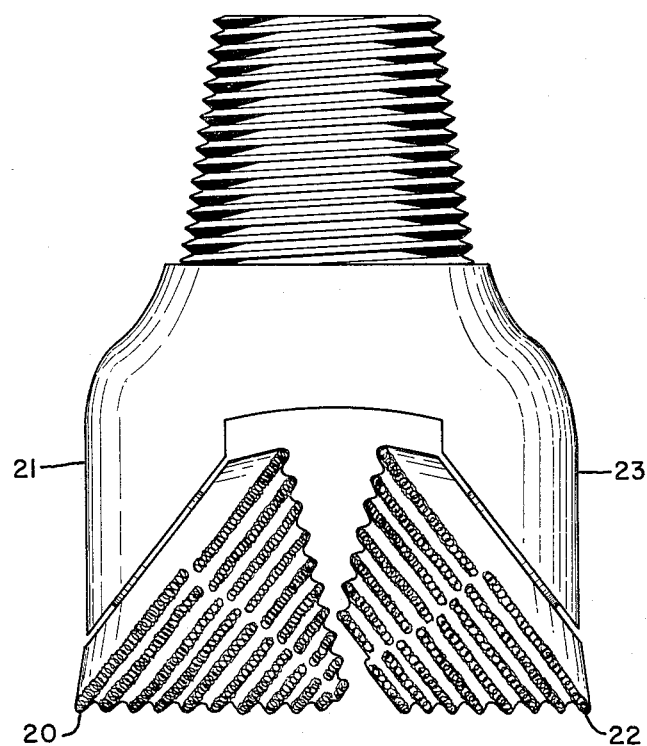
FIG. 3 illustrates a multi-element bit.

As mentioned earlier, while it is possible to employ a single cutter element in the bits of this invention, it is preferred to employ multi-element bits. The multi-element bits may use the same angular spacing of the elements that are employed in presently conventional multi-element rotary bits. A multi-element bit having conical elements 20 and 22 is illustrated in FIG. 3 supported from shanks 21 and 23 respectively.

Having thus described this invention it will be recognized that a number of variations and modifications of the invention may be adopted and practiced. The invention, therefore, is not to be limited by the specific details herein set forth but rather by the claims that follow.

I claim:
1. A conical cutter for rotary drill bit comprising a conical body having a base and an apex, two groups of continuous ridges having hardened cutting edges on said body substantially parallel to the base thereof and substantially equally spaced from the base to the apex, the base of said body having a diameter equal to about two-thirds the effective diameter of the bit, each group of ridges extending one-half the distance around said body, and each ridge in one group being separated from the adjacent ridge in the other group by a distance equal to about one-half the height of each ridge whereby the ends of each ridge in one group are spaced between opposite ends of adjacent ridges in the other group.

2. A cutter as defined in claim 1 in which the body is frusto-conical.

3. A conical cutter element for a rotary drill bit which comprises an essential conical body with an apex and a base whose diameter is equal to about two-thirds the effective diameter of the bit, two groups of continuous ridges having hardened cutting edges on the wall surface of the conical body, each group extending substantially half-way around the body and being spaced equally from the base to the apex, all of said ridges being parallel to the base of the body, the ridges in each group being spaced from one another by a distance equal to about the ridge pitch distance and spaced longitudinally with respect to the axis of said conical element from the ridges in the opposite group.

4. A cutter element for a rotary drill bit which comprises an essentially conical body having a base and an apex whose base diameter of the body is equal to about two-thirds the effective diameter of the bit, two groups of ridges on the wall surface of the body, each group extending around semi-peripheries of the body, all of said ridges in each group being continuous and having hardened cutting edges and being parallel to the base of the body and spaced along the length of the body from the base to the apex, the ridges in one group being staggered along the body relative to the ridges in the other group and separated by a distance approximately equal to one-half the height of each ridge.

5. In a rotary drill bit including a shank, the improvement which comprises a plurality of roller cutter elements rotatably supported from said shank, each element including an essentially conical body having an apex and a base whose diameter is equal to about two-thirds the effective diameter of the bit, a first plurality of continuous ridges having hardened cutting edges spaced along the length of the body from the base to the apex and being parallel to the base of the body and extending around a first half of the body, a second plurality of continuous ridges having hardened cutting edges also spaced along the length of said body from the base to the apex and substantially parallel to the base thereof and extending around the remaining half of said body, said first plurality of ridges being staggered along the length of the body relative to the second plurality of ridges, each ridge in said first plurality of ridges being separated from an adjacent ridge in said second plurality of ridges by a distance equal to about one-half the height of each ridge.

References Cited in the file of this patent

UNITED STATES PATENTS

| | | |
|---|---|---|
| 1,010,144 | Hughes | Nov. 28, 1911 |
| 1,860,587 | Metzger | May 31, 1932 |
| 2,228,286 | Ross | Jan. 14, 1941 |
| 2,533,257 | Woods et al. | Dec. 12, 1950 |
| 2,533,258 | Morlan et al. | Dec. 12, 1950 |
| 2,533,259 | Woods et al. | Dec. 12, 1950 |